(12) United States Patent
Collins, Jr.

(10) Patent No.: US 7,093,760 B1
(45) Date of Patent: Aug. 22, 2006

(54) SYSTEM AND METHOD OF MAINTAINING A BAR CODE READER

(75) Inventor: Donald A. Collins, Jr., Dawsonville, GA (US)

(73) Assignee: NCR Corporation, Dayton, OH (US)

(*) Notice: Subject to any disclaimer, the term of this patent is extended or adjusted under 35 U.S.C. 154(b) by 101 days.

(21) Appl. No.: 10/862,810

(22) Filed: Jun. 7, 2004

(51) Int. Cl.
*G06K 7/10* (2006.01)
(52) U.S. Cl. .................. 235/462.01; 235/462.14; 235/462.15
(58) Field of Classification Search .......... 235/462.1, 235/462.14, 462.15, 462.46, 462.01
See application file for complete search history.

(56) References Cited

U.S. PATENT DOCUMENTS

| | | | | |
|---|---|---|---|---|
| 5,594,230 A | * | 1/1997 | Waite et al. | 235/462.15 |
| 2003/0042313 A1 | * | 3/2003 | Khan et al. | 235/462.46 |
| 2004/0000591 A1 | * | 1/2004 | Collins et al. | 235/462.14 |
| 2004/0164156 A1 | * | 8/2004 | Watanabe et al. | 235/462.15 |

* cited by examiner

*Primary Examiner*—Thien M. Le
*Assistant Examiner*—Daniel A. Hess
(74) *Attorney, Agent, or Firm*—Paul W. Martin

(57) ABSTRACT

A system and method of maintaining a bar code reader which bypasses a point-of-sale terminal coupled to the bar code reader. The system includes a maintenance computer, and a connection path between the maintenance computer and the bar code reader which bypasses a point-of-sale terminal connected to the bar code reader. The maintenance computer obtains bar code performance data from the bar code data over the connection path, determines the operating status of the bar code reader, and provides the operating status to a technician operating the maintenance computer.

42 Claims, 3 Drawing Sheets

SYSTEM AND METHOD OF MAINTAINING A BAR CODE READER

BACKGROUND OF THE INVENTION

The present invention relates to point of sale equipment and more specifically to system and method of maintaining a bar code reader.

Bar code readers are well known for their usefulness in retail checkout and inventory control. They are typically connected to a point-of-sale (POS) terminal, along with other peripherals.

Maintenance of bar code readers typically requires that a technician be sent to examine the bar code readers. Some maintenance might include just a software upgrade. Some upgrades are more difficult than others for the technician, particularly if the bar code reader and the POS terminal are manufactured by different companies. Also, visiting each bar code reader to obtain status information and to perform routing software upgrades is costly.

Therefore, it would be desirable to provide a method of accessing the bar code reader that does not require access to or knowledge of POS terminals.

SUMMARY OF THE INVENTION

In accordance with the teachings of the present invention, a system and method of maintaining a bar code reader is provided.

The system includes a maintenance computer, and a connection path between the maintenance computer and the bar code reader which bypasses a point-of-sale terminal connected to the bar code reader. The maintenance computer obtains bar code performance data from the bar code data over the connection path, determines the operating status of the bar code reader, and provides the operating status to a technician operating the maintenance computer.

It is accordingly an object of the present invention to provide a system and method of maintaining a bar code reader It is another object of the present invention to provide a bar code reader with network access.

It is another object of the present invention to provide a method of transferring data to and from a bar code reader through a network.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
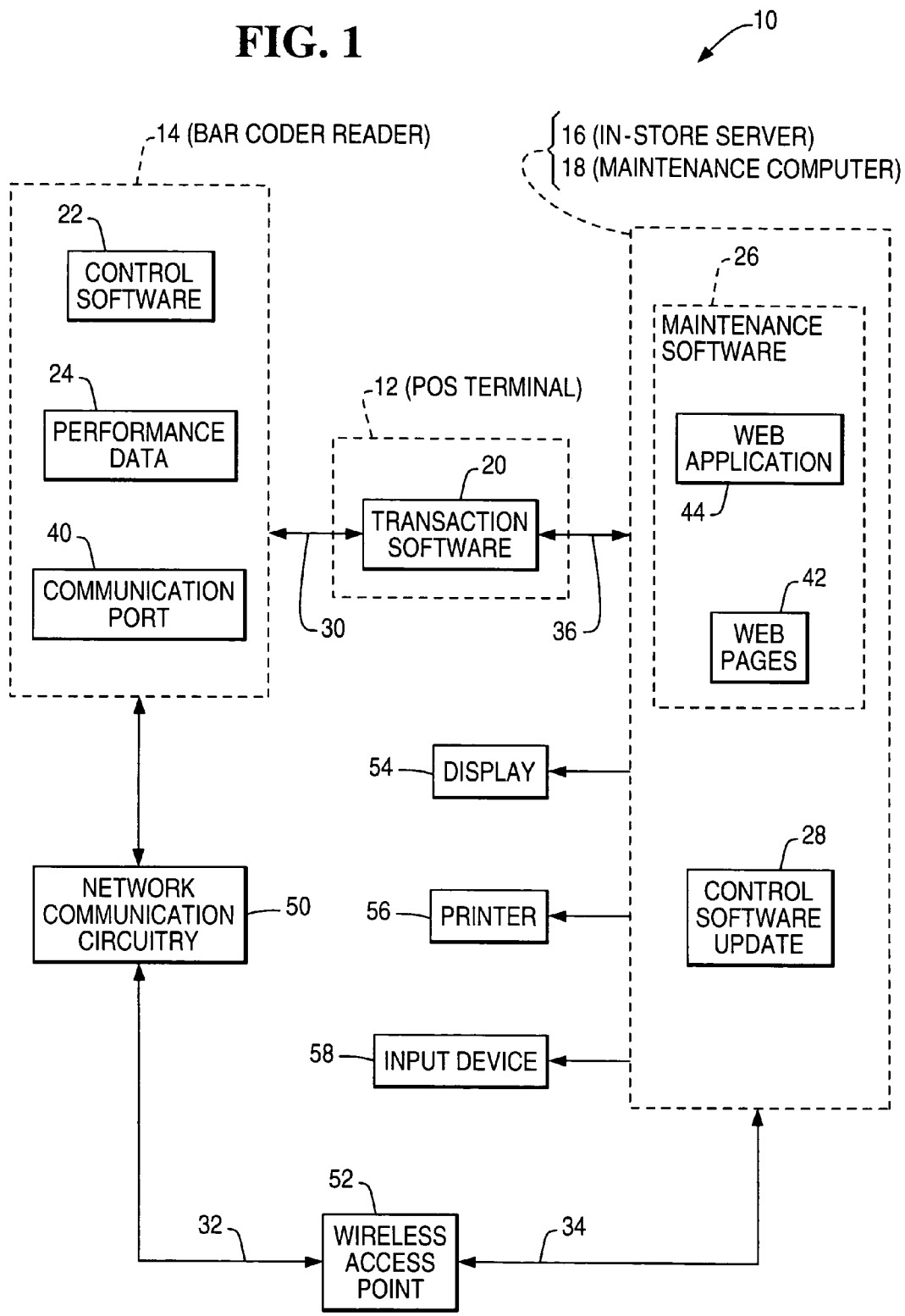
FIG. 1 is a block diagram of a transaction system illustrating a method of performing maintenance on a bar code reader.

Referring now to FIG. 1, transaction system 10 includes point-of-sale (POS) terminal 12, bar code reader 14, and in-store server 16.

POS terminal 12 executes transaction software 20, which processes items for purchase. Transaction software 20 obtains item identification information from bar code reader 14 over path 30, determines prices of the items for purchase from in-store server 16 over network path 36, tallies the prices of all items, and processes payment for the items. Path 30 may include a serial communication path, such as a universal serial bus (USB) connection.

Bar code reader 14 executes control software 22, which identifies bar code data on purchased items, decodes the bar code data, and provides the item identification information to transaction software 20. Control software 20 may be stored as firmware.

Bar code reader 14 includes a plurality of communication ports. One communication 40 couples to network communication circuitry 50, which may include a USB wireless network adapter. Alternatively, network communication circuitry 50 may include a USB network adapter for establishing a wired network connection to maintenance computer 18 using a network cable.

Bar code reader 14 collects performance data 24 during its operation. Performance data 24 is useful for determining the operating status of bar code reader 14. In a first embodiment, bar code reader 14 transfers performance data 24 to in-store server 16 over network paths 32 and 34. Network path 32 is preferably wireless. Network path 34 is preferably wired as a network cable. Wireless access point 52 acts as a bridge between network paths 32 and 34. Network paths 34 and 36 may include a network switch to facilitate cable connections between POS terminal 12, in-store server 16, and wireless access point 52 or bar code reader 14.

Figure 2:
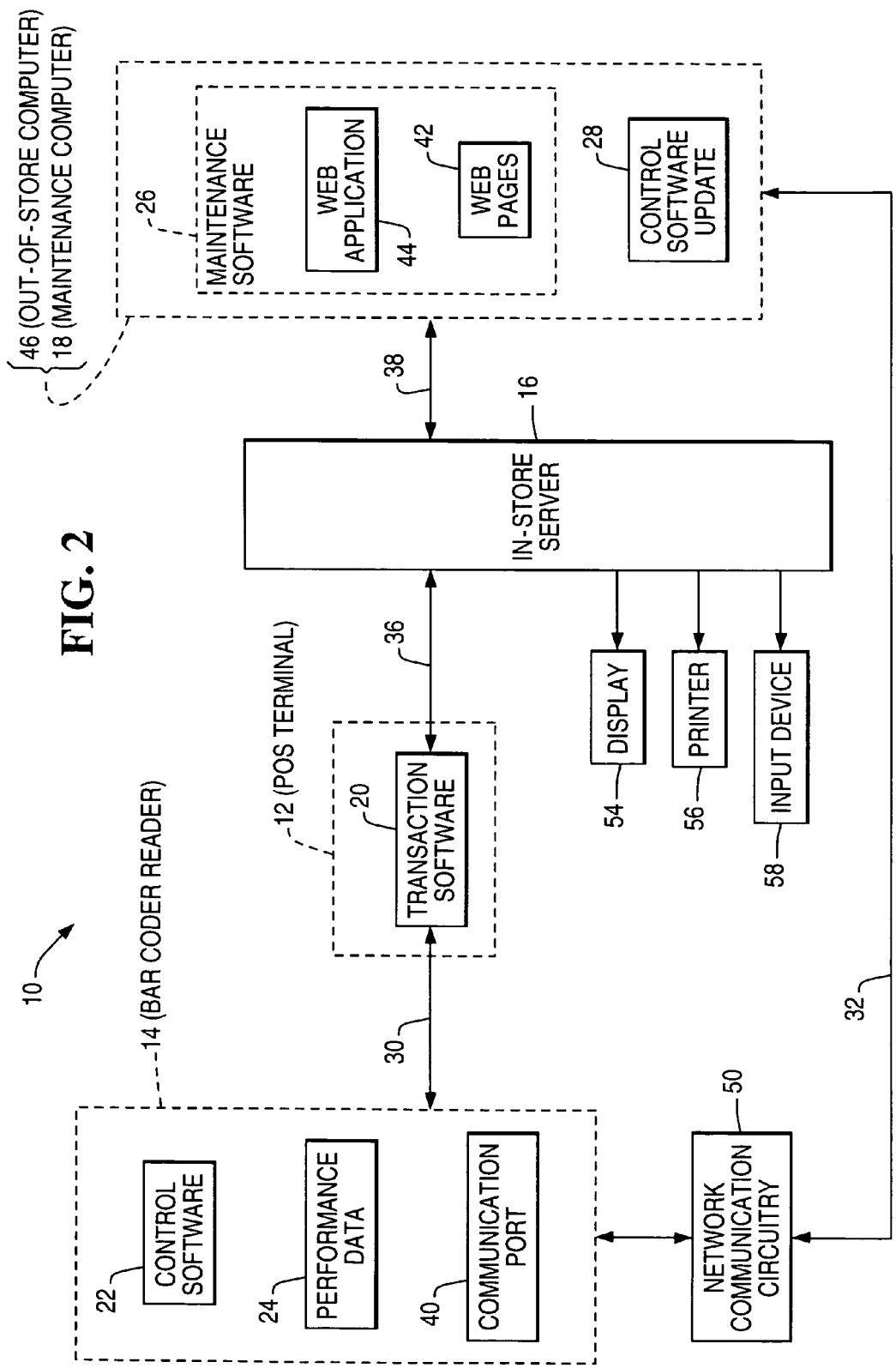
FIG. 2 is a block diagram of a transaction system illustrating another method of performing maintenance on the bar code reader.

Although a combination wired and wireless connection path between bar code reader 14 and in-store server 16 is illustrated, the present invention also envisions a totally wired or totally wireless connection 32 between in-store server 16 and bar code reader 14 (FIG. 2).

In the first embodiment, an in-store computer connected to the in-store network acts as a maintenance computer 18. For purposes of illustration, FIG. 1 shows in-store server 16 as maintenance computer 18. However, it is envisioned that a different in-store computer connected to the in-store network may act as maintenance computer 18.

In-store server 16 executes maintenance software 26. Maintenance software 26 analyzes performance data 24 and provides status information and recommendations to a technician.

In-store server 16 may include a web server and maintenance software 26 may include web application 44 and web pages 42 for allowing a technician to initiate uploading of performance data 24 from bar code reader 14 over network connections 32 and 34.

In-store server 16 or bar code reader 14 may automatically execute maintenance software 26 at predetermined times, such as during checkout to obtain the latest checkout performance data 24.

Maintenance software 26 may include web application 44 for analyzing performance data 24 and providing operating status information to help a technician. The technician accesses web application 44 through a home page within web pages 42. Web application 44 may display the operating status information in web pages 42. Under technician control, in-store server 16 displays web pages 42.

The technician may also access the maintenance software web application 44 to download control software update 28 to bar code reader 14 over in-store network paths 32 and 34. In this way, a technician may obtain performance data 24 and upgrade bar code reader 14 with control software update 28 without having to operate POS terminal 12.

Alternatively, maintenance software 26 may automatically deliver control software update 28. For example, in-store server 16 may automatically look for a new control software update 28, download the new control software update 28 if it exists, and deliver it to bar code reader 14.

A technician operating maintenance software 26 may interact with maintenance software 26 through display 54 and input device 58. Display 54 displays web pages 42 and bar code operating status information. Printer 56 may print reports containing bar code status information from maintenance software 26.

Referring now to FIG. 2, maintenance software 26 may alternatively be executed by an out-of-store computer 46 acting as maintenance computer 18. Out-of-store computer 46 may include a remote maintenance server, remote personal computer, or remote portable computer.

In-store server 16 connects to out-of-store computer 46 through path 38, which may include a dial-up connection path, broadband connection path, or other type of connection path. Path 38 may include a coaxial cable modem or digital subscriber line (DSL) modem. Path 38 may include a network connection path. Path 38 may include a global communication network or Internet path.

A technician accesses maintenance software 26 to upload performance data 24 from in-store server 16 or directly from bar code reader 14 over network connection 32. Under technician control, in-store server 16 displays web pages 42.

The technician may also access maintenance software 26 to download control software update 28 to in-store server 16 or directly to bar code reader 14.

Figure 3:
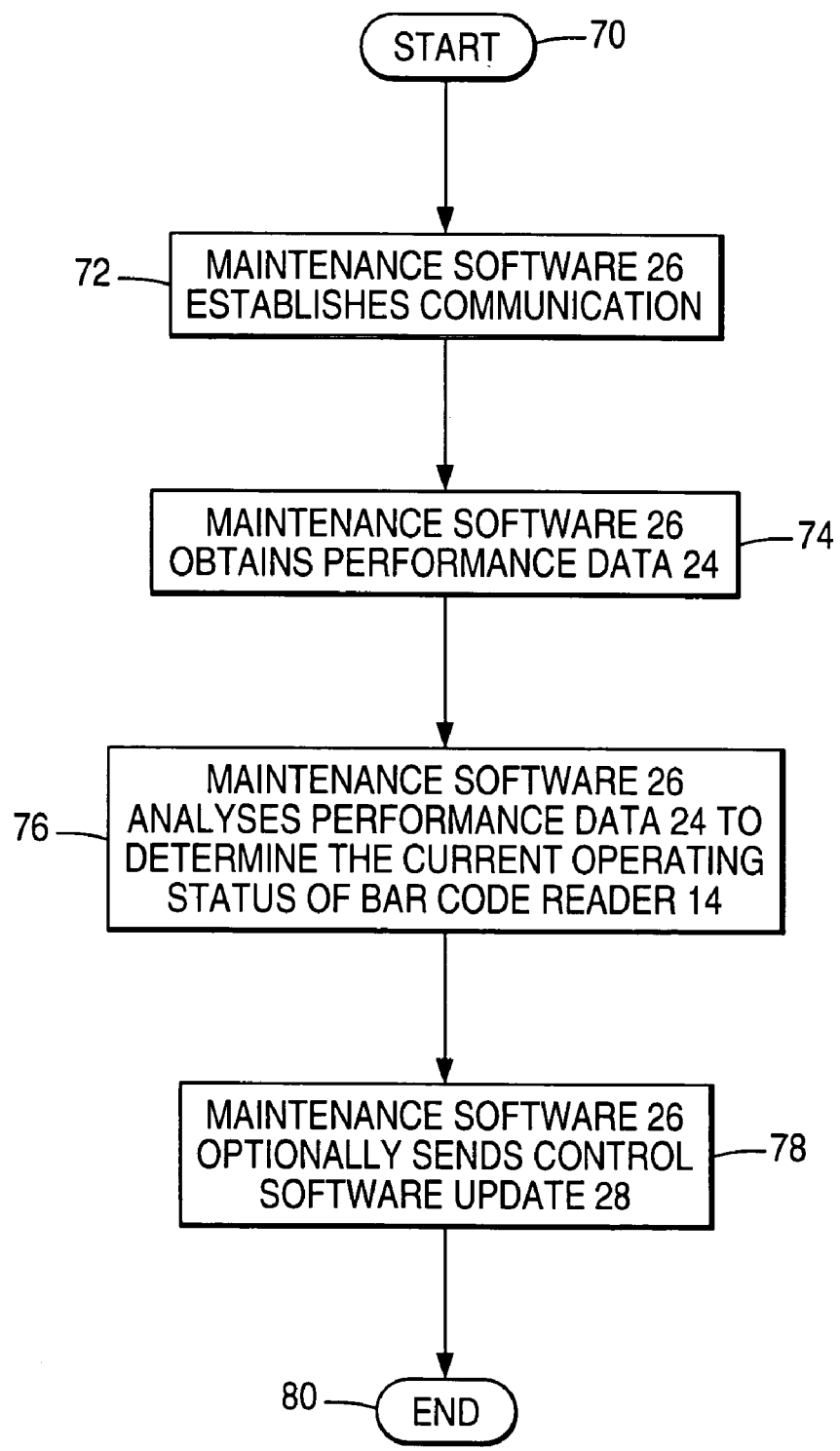
FIG. 3 is a flow diagram illustrating a method of maintaining a bar code reader.

Turning now to FIG. 3, a maintenance method is illustrated beginning with START 70.

In step 72, maintenance software 26 establishes communication. If maintenance software 26 is executed by in-store server 16, maintenance software 26 may automatically establish communication with bar code reader 14. Alternatively, a technician may establish communication by executing maintenance software 26 and controlling operation of maintenance software 26.

If maintenance software 26 is executed by out-of-store computer 46, a technician preferably establishes communication with in-store server 16 or bar code reader 14 by establishing path 36, executing maintenance software 26, and controlling operation of maintenance software 26.

In step 74, maintenance software 26 obtains performance data 24. If maintenance software 26 is executed by in-store server 16, maintenance software 26 obtains performance data 24 from bar code reader 14 over network connection 32, or 32 and 34. If maintenance software 26 is executed by out-of-store computer 46, maintenance software 26 obtains performance data 24 from in-store server 16 over path 38 or directly from bar code reader 14 path 38 and network connection 32, or 32 and 34.

In step 76, maintenance software 26 analyzes performance data 24 to determine the current operating status of bar code reader 14 and displays the current operating status as a web page.

A technician may use the status information to determine whether hands-on maintenance of bar code reader 14 is required.

In step 78, maintenance software 26 optionally sends control software update 28. If maintenance software 26 is executed by in-store server 16, maintenance software 26 delivers control software update 28 to bar code reader 14. If maintenance software 26 is executed by out-of-store computer 46, maintenance software 26 delivers control software update 28 to in-store server 16 or directly to bar code reader 14.

Operation ends in step 80.

Advantageously, a technician may perform status checks and software updates for all bar code readers 14 from a single location.

Although the invention has been described with particular reference to certain preferred embodiments thereof, variations and modifications of the present invention can be effected within the spirit and scope of the following claims.

What is claimed is:

1. A system for maintaining a bar code reader comprising:
   a maintenance computer; and
   a network connection path between the maintenance computer and the bar code reader which bypasses a point-of-sale terminal simultaneously connected to the bar code reader through a serial connection path;
   wherein the maintenance computer obtains bar code reader performance data from the bar code reader over the network connection path, determines the operating status of the bar code reader from the bar code reader performance data, and provides the operating status to a technician operating the maintenance computer;
   wherein the maintenance computer is remote from the bar code reader and the point-of-sale terminal.

2. The system of claim 1, wherein the maintenance computer comprises an in-store computer.

3. The system of claim 2, wherein the in-store computer comprises an in-store server.

4. The system of claim 1, wherein the maintenance computer comprises an out-of-store computer.

5. The system of claim 1, wherein the maintenance computer comprises a web server for executing a web maintenance application, and for delivering the operating status as part of a web page.

6. The system of claim 1, wherein the network connection path comprises an in-store network.

7. The system of claim 6, wherein the in-store network is wired.

8. The system of claim 6, wherein the in-store network is wireless.

9. The system of claim 6, wherein the in-store network comprises a combination of wired and wireless network segments.

10. The system of claim 1, wherein the network connection path comprises an in-store network and out-of-store connection path.

11. The system of claim 10, wherein the out-of-store connection path comprises a dial-up connection path.

12. The system of claim 10, wherein the out-of-store connection path comprises a broadband connection path.

13. The system of claim 10, wherein the out-of-store connection path comprises a global communication network path.

14. The system of claim 1, wherein the maintenance computer automatically obtains the bar code reader performance data from the bar code reader.

15. The system of claim 1, wherein the maintenance computer additionally delivers software updates to the bar code reader over the network connection path.

16. A system for maintaining a bar code reader comprising:
   an in-store maintenance computer; and
   a network connection path between the in-store maintenance computer and the bar code reader which bypasses a point-of-sale terminal simultaneously connected to the bar code reader through a serial connection path;

wherein the in-store maintenance computer obtains bar code reader performance data from the bar code reader over the network connection path, determines the operating status of the bar code reader from the bar code reader performance data, and provides the operating status to a technician operating the in-store maintenance computer;

wherein the maintenance computer is remote from the bar code reader and the point-of-sale terminal.

17. The system of claim 16, wherein the network connection path includes a wireless access point connected to the in-store maintenance computer and a wireless network adapter coupled to the bar code reader for establishing a wireless network connection between the bar code reader and the wireless access point.

18. The system of claim 16, wherein the network connection path includes a network adapter coupled to the bar code reader and a network cable between the bar code reader and the in-store maintenance computer for establishing a wired network connection between the bar code reader and the maintenance computer.

19. The system of claim 16, wherein the in-store maintenance computer comprises a web server for executing a web maintenance application, and for delivering the operating status as part of a web page.

20. The system of claim 16, wherein the in-store maintenance computer automatically obtains bar code performance data from the bar code reader over the network connection path.

21. A system for maintaining a bar code reader comprising:
an out-of-store maintenance computer;
an in-store computer;
a first network connection path between the out-of-store maintenance computer and the in-store computer; and
a second network connection path between the in-store computer and the bar code reader which bypasses a point-of-sale terminal simultaneously connected to the bar code reader through a serial connection path;
wherein the out-of-store maintenance computer obtains bar code reader performance data from the bar code reader over the first and second network connection paths, determines the operating status of the bar code reader, and provides the operating status to the in-store computer.

22. The system of claim 21, wherein the first network connection path comprises a dial-up connection path.

23. The system of claim 21, wherein the first network connection path comprises a broadband connection path.

24. The system of claim 21, wherein the first network connection path comprises a global communication network path.

25. The system of claim 21, wherein the out-of-store maintenance computer comprises a web server for executing a web maintenance application, and for delivering the operating status to the in-store computer as part of a web page.

26. A method of maintaining a bar code reader comprising the steps of:
(a) establishing a network communication path between a maintenance computer and a bar code reader which bypasses a point-of-sale terminal simultaneously connected to the bar code reader through a serial connection path, wherein the maintenance computer is remote from the bar code reader and the point-of-sale terminal;

(b) obtaining bar code reader performance data from the bar code reader over the network communication path by the maintenance computer;
(c) analyzing the bar code reader performance data by the maintenance computer to determine a current operating status of the bar code reader; and
(d) providing the current operating status to a technician by the maintenance computer.

27. The method of claim 26, further comprising the step of:
(e) sending a software update to the bar code reader over the network communication path by the maintenance computer.

28. The method of claim 26, wherein step
(a) comprises the substeps of:
(a-1) establishing the network communication path through a network adapter coupled to the bar code reader.

29. The method of claim 26, wherein step
(a) comprises the substeps of:
(a-1) establishing the network communication path through a wireless network adapter coupled to the bar code reader and a wireless access point coupled to an in-store network.

30. The method of claim 26, wherein step
(a) comprises the substeps of:
(a-1) establishing the network communication path through a global communication network.

31. The method of claim 26, wherein step
(a) comprises the substeps of:
(a-1) establishing the network communication path between an in-store maintenance computer and the bar code reader.

32. The method of claim 26, wherein step
(a) comprises the substeps of:
(a-1) establishing the network communication path between an out-of-store maintenance computer and the bar code reader.

33. The method of claim 26, wherein step
(b) comprises the substeps of:
(b-1) automatically obtaining the bar code reader performance data from the bar code reader over the network communication path by the maintenance computer.

34. The method of claim 26, wherein step (b) comprises the substeps of:
(b-1) obtaining the bar code reader performance data from the bar code reader over the network communication path under control of a technician operating the maintenance computer.

35. The method of claim 26, wherein step
(c) comprises the substeps of:
(c-1) analyzing the bar code reader performance data by a web application executed by the maintenance computer.

36. The method of claim 26, wherein step (d) comprises the substeps of:
(d-1) displaying the current operating status by a display coupled to the maintenance computer.

37. The method of claim 26, wherein step (d) comprises the substeps of:
(d-1) printing the current operating status by a printer coupled to the maintenance computer.

38. A system for maintaining a bar code comprising:
a maintenance computer; and
a connection path between the maintenance computer and the bar code reader which bypasses a point-of-sale terminal connected to the bar code reader, including an in-store network and out-of-store connection path;

wherein the maintenance computer obtains bar code reader performance data from the bar code reader over the connection path, determines the operating status of the bar code reader, and provides the operating status to a technician operating the maintenance computer.

39. The system of claim 38, wherein the out-of-store connection path comprises a dial-up connection path.

40. The system of claim 38, wherein the out-of-store connection path comprises a broadband connection path.

41. The system of claim 38, wherein the out-of-store connection path comprises a global communication network path.

42. A method of maintaining a bar code reader comprising the steps of:

(a) establishing a communication path between a maintenance computer and a bar code reader which bypasses a point-of-sale terminal, including establishing the network path through a global communication network;

(b) obtaining performance data from the bar code reader over the communication path by the maintenance computer;

(c) analyzing the performance data by the maintenance computer to determine a current operating status of the bar code reader; and (d) providing the current operating status to a technician by the maintenance computer.

* * * * *